United States Patent [19]

Ferchau et al.

[11] Patent Number: 5,291,838
[45] Date of Patent: Mar. 8, 1994

[54] PACKAGING SYSTEM

[75] Inventors: Joerg U. Ferchau, Morgan Hill; Robert E. Smith, Woodwise; Hoa Pham, San Jose; Victor Trujillo, Fremont; Randall J. Diaz, Gilroy; Josonando Joson, Fremont, all of Calif.

[73] Assignee: Tandem Computers Incorporated, Cupertino, Calif..

[21] Appl. No.: 775,634

[22] Filed: Oct. 10, 1991

[51] Int. Cl.⁵ .............................. A47B 47/00
[52] U.S. Cl. ........................... 108/180; 312/223.6; 108/50; 108/190
[58] Field of Search .................. 108/101, 111, 149, 50, 108/161; 312/223.6, 108

[56] References Cited

U.S. PATENT DOCUMENTS

| | | | |
|---|---|---|---|
| 4,467,927 | 8/1984 | Nathan | 108/111 |
| 4,474,416 | 10/1984 | Rogahn | 108/111 |
| 4,941,412 | 7/1990 | Engel | 108/111 |

Primary Examiner—James R. Brittain
Assistant Examiner—Gerald A. Anderson
Attorney, Agent, or Firm—Townsend and Townsend Khourie and Crew

[57] ABSTRACT

A packaging system for components of a computing system includes an external, modularized, ecto-skeletal support frame for supporting a plurality of uniformly, horizontally dimensioned cabinets in stacked arrangement. The support frame is formed from a plurality of support shelves that form the support platforms for the cabinets. Separating and support shelves are support sleeves, that can be of variable lengths in order to accommodate the varying vertical dimensions of the cabinets held by the support frame.

12 Claims, 5 Drawing Sheets

PACKAGING SYSTEM

BACKGROUND OF THE INVENTION

The present invention is directed generally to packaging electronic components, and more particularly to a packaging system for the component parts of large computing systems, incorporating a modular constructed ecto-skeletal support structure for holding component cabinets in a stacked, registered, integrated arrangement.

Particularly prevalent in the computing industry is the encroachment upon floor space of cabinets housing the component parts of larger computing systems. As the technology for large computing systems grows, permitting more component parts (e.g., secondary storage in the form of disk units, tape units and the like, controllers, etc.) to be added to and integrated into a computing system, the space needed to situate these components parts can become a pressing problem. The problem is exacerbated by the fact that such component parts are all too often purchased from different manufacturers, resulting in a competing system comprising a number of different-sized boxes to be arranged on available floor space. The problems grow with the cabling used to interconnect the various components of such large scale systems, becoming more than a mere annoyance unless properly maintained.

Also, such individual component parts, often packaged in their own cabinets, are incorporated into a system by placing them in larger cabinets, creating a "box within a box" design concept. Such packaging, however, can substantially increase the cost of the system in terms of material and labor.

Since many companies today are becoming hardware systems integrators, utilizing industry standard purchased parts to build a product, these problems are becoming more and more common.

Thus, it is evident that a new approach to packaging is needed.

SUMMARY OF THE INVENTION

The present invention is directed to a novel packaging concept in which separate components of a system are placed in individual, universal form factor cabinets that are then stacked vertically, reducing the floor space needed for the system created by the components.

Broadly, the invention comprises a modular, external ecto-skeletal support structure or frame formed from a number of individual shelf units of substantially identical horizontal dimensions. Each shelf unit has, extending upward from a support surface and mounted at the periphery thereof, a number of upright elements. Overlying shelves have downward vertical members, axially aligned with the corresponding upright elements. Support sleeves are formed and configured to be mounted on the upright elements of one shelf, and to receive the downward vertical members of a second, overlying shelf for mounting and supporting the one shelf to the other, forming the support frame. The support sleeves are of various lengths, providing for variations in spacing between the shelves.

In a preferred embodiment of the invention, the support sleeves are configured to form a cableway to receive and hold cabling from the various cabinets, routing the cabling between the cabinets as need be.

In the preferred embodiment of the invention, small, low cost, universal form factor cabinets are used to give advantage to, as well as take advantage of, the modularity and uniformity of the parts (support shelves) of the external support frame, permitting vertical stacking of the cabinets. Each cabinet is fully self-contained in the sense that each has its own separate cooling, electromagnetic compatibility (EMC) design, and power distribution system and the like.

The support frame forms the structural backbone for each cabinet, moving the structural components from the cabinet to the support frame itself. Since the structural integrity of the cabinets is not needed in order to stack them, they may be fabricated of lighter weight material, reducing cost.

The modularity of support frames requires only an addition of an additional support shelf in order to add components without taking up additional floor space.

These and other advantages of the present invention, including additional features and aspects thereof, will become apparent to those skilled in this art upon reading of the following detailed description of the invention, which should be taken in conjunction with the accompanying drawings.

DESCRIPTION OF THE PREFERRED EMBODIMENT

Figure 1:
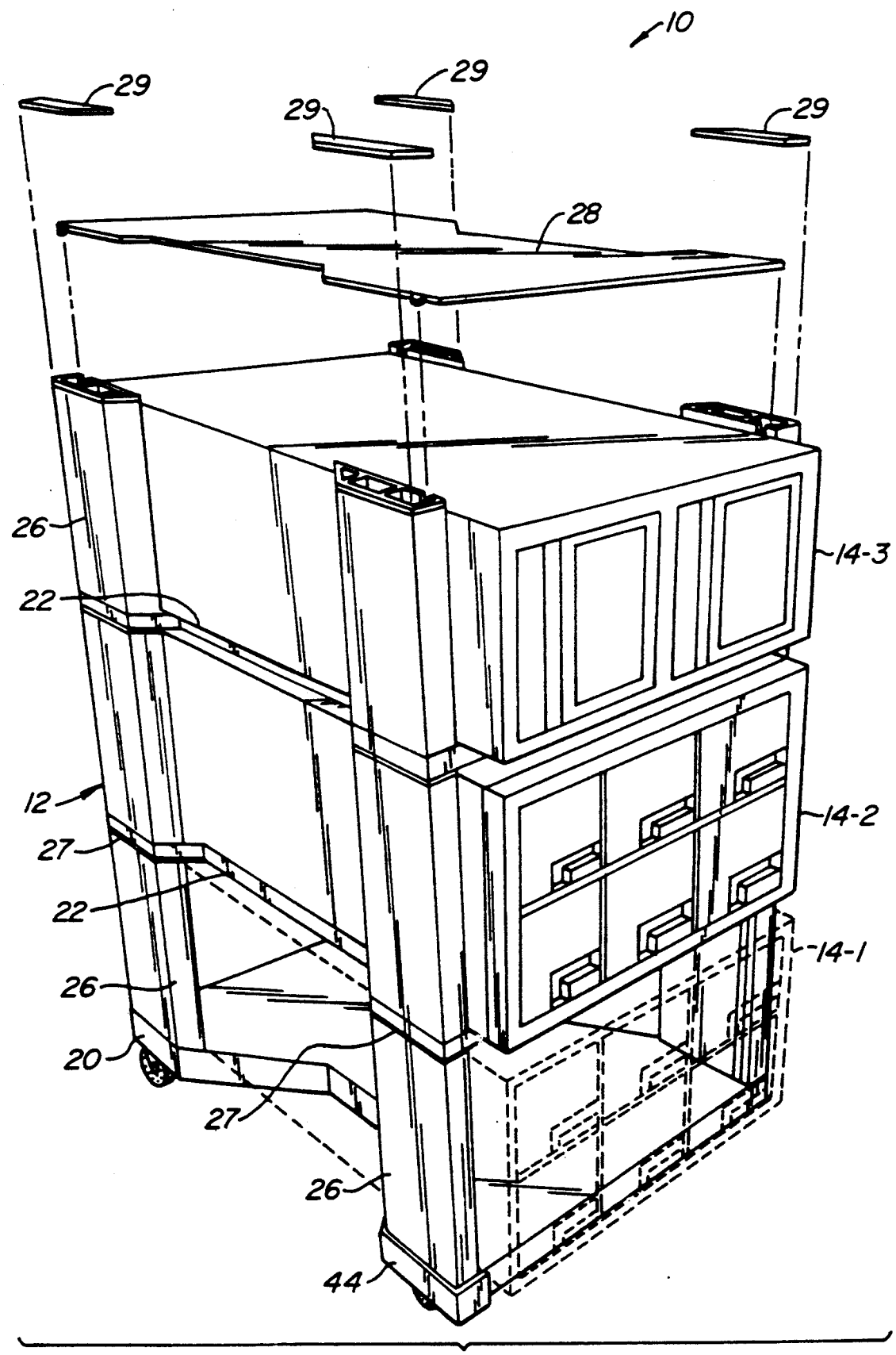
FIG. 1 is a perspective view of the packaging system of the present invention, illustrating the external, ecto-skeletal support frame in assembled form, holding a number of individual, electronics-containing cabinets.

Turning now to the figures, and for the moment specifically FIG. 1, there is illustrated, designated generally with the reference numeral 10, the packaging system of the present invention. As FIG. 1 shows, the packaging system 10 includes an external, ecto-skeletal support frame 12 holding, in stacked arrangement, a plurality of cabinets 14.

The ecto-skeletal support frame 12 comprises, broadly, a base support shelf 20 supporting a number of upper shelves 22, all of which are supported and spaced from one another by removable support sleeves 26. As will be seen in connection with the following discussion, the horizontal dimensions of the base support shelf 20, and upper support shelves 22, are substantially identical, and the upper support shelves themselves are substantially identical to one another in overall design.

Figure 2A:
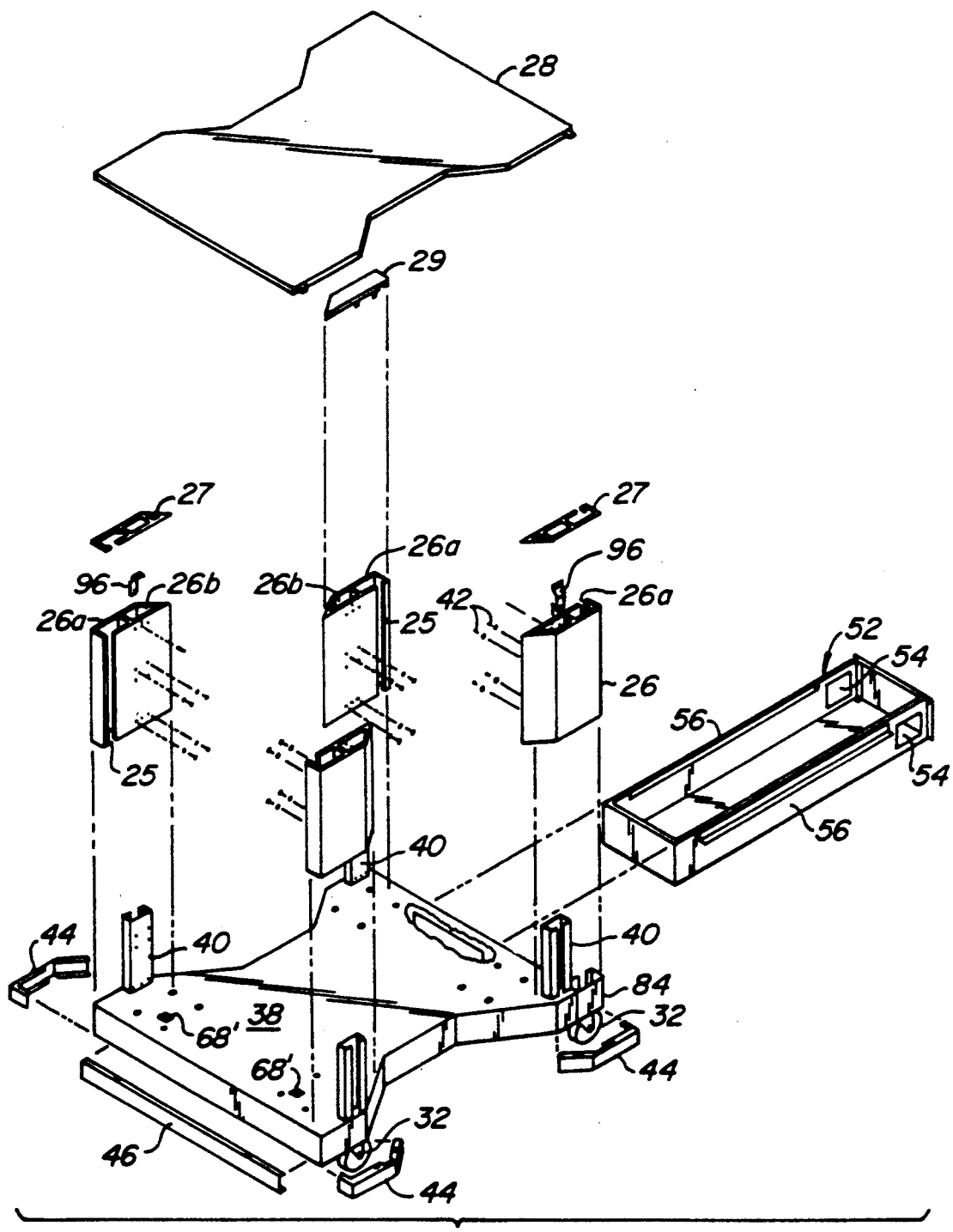
FIGS. 2A and 2B illustrate, in exploded form, the base shelf of the support frame shown in FIG. 1.
Figure 2B:
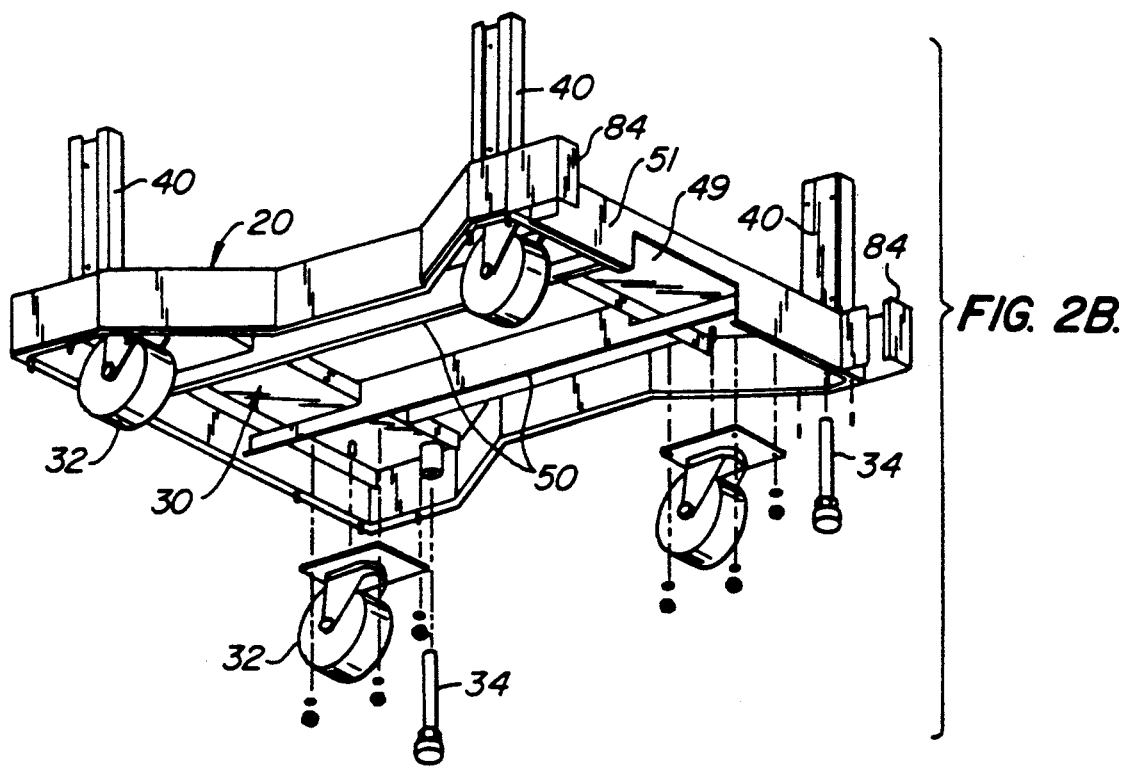

As better illustrated in FIGS. 2A and 2B the base support shelf 20 has fastened to the undersurface 30, proximate each of the four corners thereof, casters 32, mounted by threaded nuts received by threaded studs that project from the underside 30. Also mounted to the underside 30 of the base support shelf 20, near each caster 32, are levelling bolts 34. The levelling bolts 34 are threadably mounted for rotation to adjust the height of base support member 20.

Mounted to, and extending generally upward from a support surface 38 of the base support shelf 20 are upright elements 40, one each located proximate a corresponding one of the four corners of the support surface 38. The upright elements 40 are formed and configured to have the support sleeves 26 slidably mounted thereon, and held fastened thereto by any type of fastening means, such as screws 42 that run through the support sleeves 26 and fasten to the upright elements 40, as illustrated in FIG. 2A. As can be seen in FIG. 2A, the support sleeves 26 are formed with two parallel, generally rectangular, longitudinal channels 26a, 26b therethrough. The upright elements 40 are received by the channels 26b of the support sleeves 26. As will be seen, the channels 26a of certain of the support sleeves 26 (notably, these two at the rear of the shelves) cooperatively form a cableway for receiving and holding I/O, power, and other cabling or lines (e.g., pneumatic or fluid lines, or the like). For this purpose, the channel 26a of each support sleeve 26 is opened along the length of the channel by a slot 25, permitting insertion and removal of cabling in and from the channel.

Figure 3:
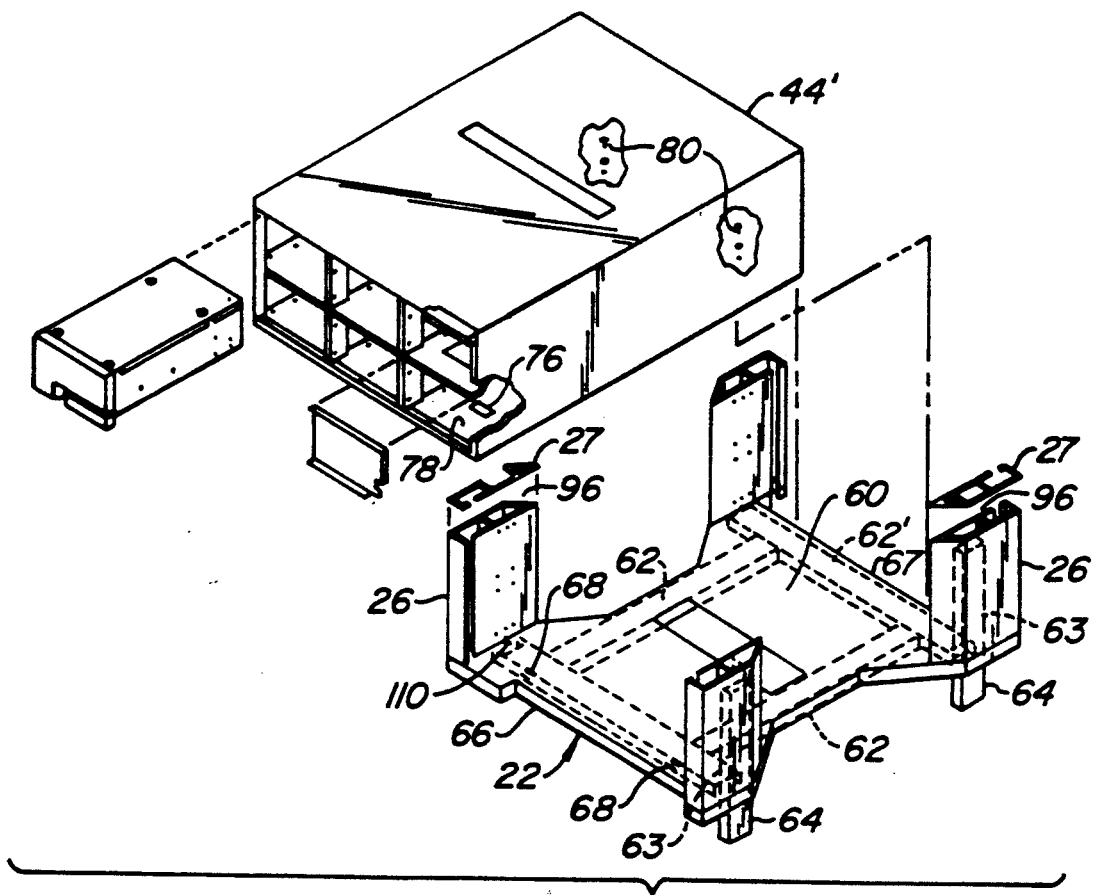
FIG. 3 illustrates one of the upper support shelves of the support frame of FIG. 1, showing with it a cabinet to be supported, the cabinet housing modular electronic devices.

Placed to fit between the upper periphery of the support sleeves 26 and the upper support shelf 22 is a gasket 27. As FIG. 2A (and FIG. 3) illustrates, the gasket 27 is shaped and configured to have the same basic outline as the cross-section of the support sleeves 26. (Each upper periphery of each support sleeve 26 is provided with a gasket 27, not all of which are shown in FIGS. 2A and 3 for reasons of clarity.) The gaskets operate to provide shock and vibration isolation, or if desired can also provide electrical isolation (if fabricated from a non-conductive material), or alternatively, electrical grounding (if fabricated from a conductive rubber material, for example) between parts.

A top sheet 28 is used to cover the topmost cabinet of the system 10, when assembled. Here, in place of the gaskets 27, top pieces 29 are used to cover the openings of the support sleeves 26.

Also mounted to the undersurface 30 of the base support shelf 20 are a pair of spaced, parallel rail members 50 for receiving, through opening 49 formed in a back wall 51, a drawer 52. The drawer 52 is adapted to contain a power bus (not shown) for distribution of electrical power to the cabinets 14 mounted in the packaging system 10. Preferably, the base support shelf 20 will support a cabinet 44 (FIG. 1) housing a source of at least primary power used by the other cabinets 44 for creating secondary power for use by the electronics contained within each cabinet. For that reason, apertures, 54 are formed in the longitudinal sidewalls 56 of the drawer 52 for allowing power cabling to pass therethrough, into and out of the drawer—to and from the power bus (not shown).

As best illustrated in FIG. 2A, the base support shelf is provided with snap-on corner bumpers 44, and a front bumper or rail 46.

Turning now to FIG. 3, an upper support shelf 22 is illustrated. As indicated above, the support shelves 22 are substantially identical in structure and function. Accordingly, the following discussion of the support shelf 22 shown in FIG. 3 shall apply equally to all other support shelves, unless otherwise noted (such as hereinbefore noted in respect of the base support shelf 20).

As FIG. 3 shows, the support shelf 22 includes a planar support surface 60, the under-side of which has mounted thereto a lattice-work of channel members 62 (shown in phantom) to provide structural support to the support surface 60. Mounted proximate each of the four corners of the support shelf 22 is an upright element 63 (shown in phantom) substantially similar to, and in much the same manner as, the upright elements 40 of the base support shelf 20. The upright elements of the support shelf 22 are hidden from view in FIG. 3 by the support sleeves 26 mounted thereon.

Continuing with FIG. 3 the support shelf 22 is shown as including a downward vertical element 64 mounted to the underside of the support shelf 22 proximate each corner thereof, and in axial alignment with the corresponding upright element 63. The downward vertical elements are positioned and configured to be received by the upper portions of the channel 26b (FIG. 2A) of support sleeves 26 that extend from the underlying support shelf 22, or the base support shelf 20, upon which the support shelf 22 of FIG. 3 is to be mounted.

Figure 5:
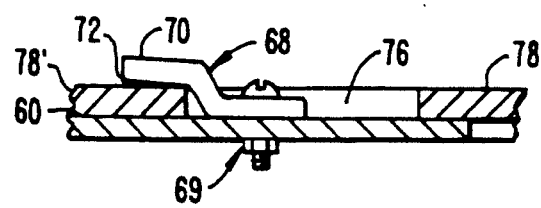
FIG. 5 illustrates a clip element for removable holding cabinets in place on the support surfaces provided by the base and upper support shelves of the support frame.

Affixed to the upper surface 60, proximate the front portion 66 of the support shelf 22, are a pair of clips 68. Referring for the moment to FIG. 5, the shape and configuration of the clip 68 is better illustrated, showing the clip 68 as including a raised portion 70 that forms a gap 72 with the support surface 60 when the clip 68 is mounted thereto. The gap 72 is dimensioned to receive a segment 78 of a bottom wall 78 of a cabinet 44' (FIG. 3) to hold the cabinet 44 in place on the support surface 60.

For this purpose, the cabinet 44' includes cut-outs 76 (FIG. 3) formed in the bottom wall 78. The cabinet 44' can be inserted from the front 66 of the support shelf 22, and moved along the support surface 60 until the cut-out 76 drop over the tab 68. Further movement of the cabinet 44' will move the bottom wall segment 78' (FIG. 5) into the gap 72, and beneath the raised portion 70 of the clip 68. Screws 80 (FIG. 3) form a fastening means for the cabinet 44' by piercing the bottom wall 78 and fastening to the underlying channel member 62 of the support surface 60, holding the cabinet 44' in place relative to support shelf 22.

In the same manner, identical clips 68' mounted to the support surface 38 of the base support shelf 20 retain a cabinet (FIG. 2A).

Figure 4:
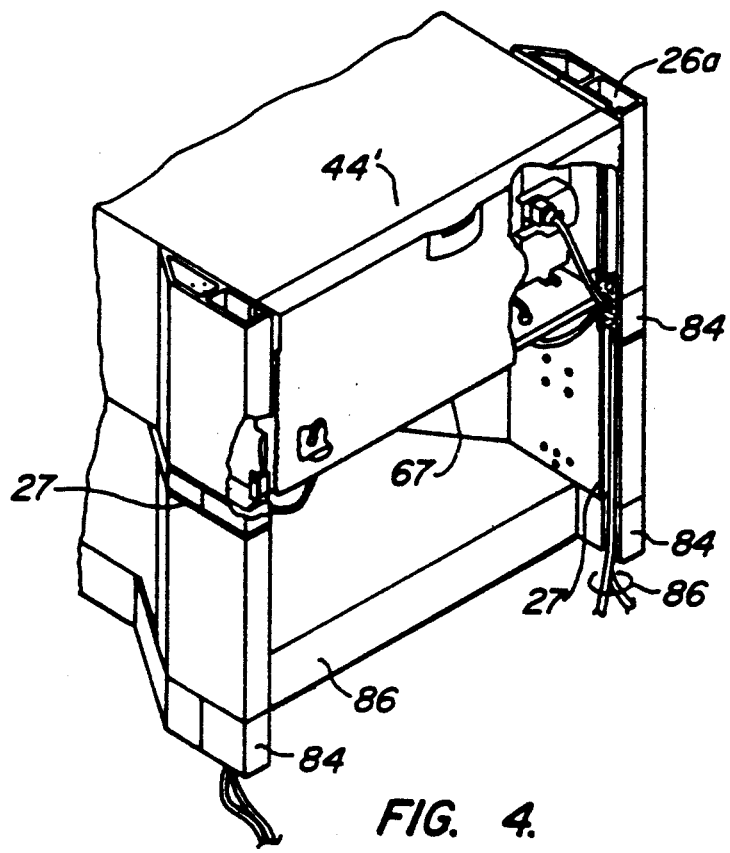
FIG. 4 illustrates the cableway formed by vertical support members to route cables from supported cabinets to and from a central distribution point.

Referring now to FIGS. 2B, 3 and 4, note that formed on the back wall 51 of the support base 20, and on the back portion 67 of the support shelves 22 (FIGS. 3 and 4), at the corners of each, are J-shaped channel members 84. The channel members 84 are formed to have cross-sectional configurations that match that of channels 26a of support sleeves 26. So formed, and with the support sleeves 26 mounted, the configuration and position of the channel members 84 and channels 26a of the support sleeves 26 axially align with one another, as illustrated in FIG. 4, forming a pair of vertical, elongate cableways for receiving, containing and directing I/O and power cables 86 from and to, for example, the cabinet 44'.

Figure 6A:
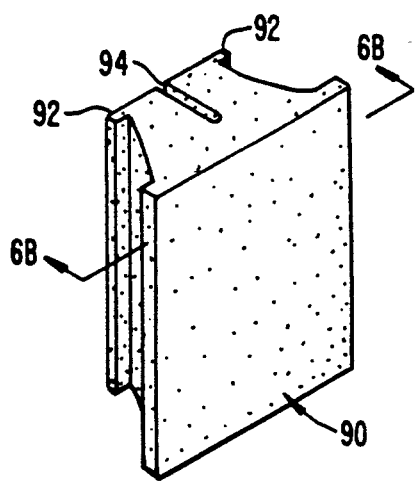
FIGS. 6A and 6B illustrate the retainer used to hold cabling in the cableways, as illustrated in FIG. 4.
Figure 6B:
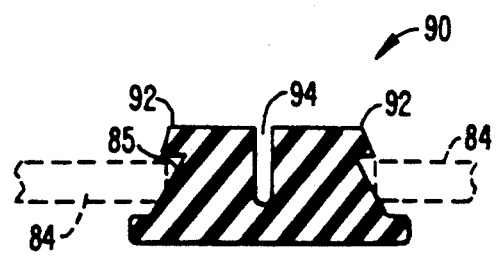

The cabling 86 can be held in place by cooperating pairs of retainers 90. As better illustrated in FIGS. 6A and 6B, the retainers 90 includes side wings 92 separated by a groove 94. The groove 94 is to permit the wing members 92 to be compressed toward one another so that the retainer 90 can be inserted through the slot 25 of either the J-shaped channels 84 or the aperture 86, and into the channel, capturing the cabling 86 therein. In this manner cables not only are clearly routed, but the slot 27 and retainers 90 provide strain relief to the cables, in addition to complying with required bend paths of cabling. The retainers 90 are capable of being slipped vertically in the slot 25, permitting adjustment or "tuning" cable ingress to or egress from the slot 25. If desired, the retainers 90 may be color-coded to identify cable functions.

Figure 7:
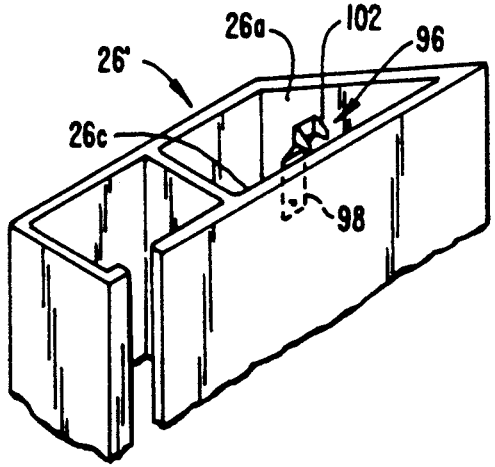
FIG. 7 illustrates the detent spring mechanism used to releasably capture and hold support sleeves to a support shelf.

The support frame, when assembled, is held together by release means that removable holds certain ones of the support sleeves 26 to an overlying support shelf 22. Referring now to FIG. 7, illustrated is a support sleeve 26' with a spring detent 96 affixed at the top of an inside sidewall 26c of the channel 26a. The spring detent 96 includes a body section 98, projecting upward and inward (i.e., toward an opposing support sleeve 26—see FIGS. 2A and 3) therefrom is a top portion 100 that extends out of and beyond the end of the associated support sleeve 26'. At the terminus of the top portion 100 is a somewhat triangularly shaped head portion 102.

Preferably, only one diagonally opposed pair of the support sleeves 26' (FIGS. 2A and 3) for each overlying support shelf 22 need be equipped with the spring detent 96. In this way an overlying support shelf 22 is releasably held to the underlying support shelf (be it a base shelf 20, or an underlying shelf 22) in stable fashion.

Figure 8:
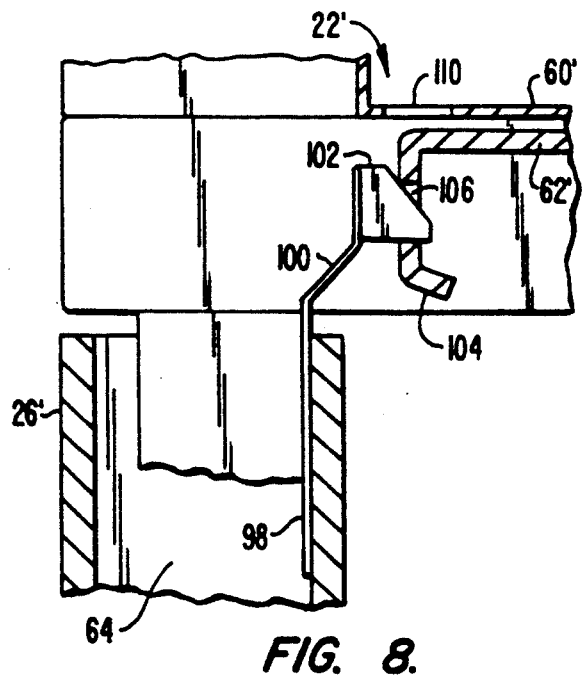
FIG. 8 illustrates operation of the detent spring mechanism.

Referring to FIG. 8, an overlying support shelf 22' is illustrated mounted to an underling shelf (not shown in FIG. 8) by the support sleeve 26'. As indicated above, mounting an overlying support shelf 22' necessitates inserting downward vertical members 64 into the (upward extending) support sleeves 26 that are extending upward from the support shelf or base to which the support shelf 22' is being mounted. As shown in FIG. 8, the front and back cross-channels 62' are folded at their terminus' to form endwalls 104. Formed in the endwalls 104 are apertures 106, sized and configured to receive the head portions 102 of the spring detent 96.

As FIG. 8 illustrates, when the (overlying) support shelf 22' is mounted to another (underlying support shelf 22 (or the base support shelf 20, as the case may be), as the downward vertical member are inserted into the upward-extending sleeve member 26', the head portion 102 of the spring detent 96 is brought into engagement with the apertures 106 formed in the folded terminus of the cross-channel 62', effectively locking the support sleeve 26' to the overlying support shelf 22'.

Removal of the overlying support shelf 22' requires "un-locking" the detent spring 96 from its engagement with the cross-channels 62'. For this purpose a through-port 110 is provided in the support surface 60' of the support shelf 22 for access of a rigid tool, such as a screwdriver, or a steel rod. The tool can be used to push the head portion 102 of the detent spring 96 away from its capture relation with the aperture 106, thereby releasing the overlying support shelf 22'.

In the preferred embodiment of the invention, the sleeve members are fabricated from extruded aluminum. The base and upper support shelves are formed from sheet metal and welded structural tubing.

Although a complete and thorough description of the present invention has been presented in the foregoing discussion, it will be evident that alternate embodiments and modifications can be made to the invention without departing from the spirit and scope of the invention.

What is claimed is:

1. A packaging system for a plurality of self-contained electronic units, each of the plurality of electronic units having substantially identical footprint dimensions and having cabling emanating therefrom, first ones of the plurality of the electronic units having a first vertical dimension, second ones of the electronic units having a second vertical dimension, the packaging system comprising:

a base member, including a generally horizontal base support surface, for supporting on the base support surface a one of the plurality of electronic units, and a plurality of upright elements;

a plurality of shelf members, of substantially the same size and shape, each of the plurality of shelf members including a shelf support surface, for supporting a corresponding one of the electronic units, a number of downward vertical elements and, for each downward vertical element, an upward vertical element; and a plurality of supporting sleeve members, each of the plurality of sleeve members being formed and configured to removable receive and connect corresponding ones of the upright elements of the base member and the downward vertical elements of a one of the shelf members and corresponding ones of the upward vertical elements and the downward vertical elements;

whereby a number of the shelf members is supported by a number of the sleeve members above the base member in registered relation above the base member; and predetermined ones of the supporting sleeve members being vertically aligned, each of the predetermined supporting sleeve members having formed therein a cable-receiving channel, the cable-receiving channels of the predetermined ones of the supporting members being linearly aligned to form a cableway for receiving the cabling emanating from the electronic units.

2. The packaging system of claim 1, wherein a first number of the plurality of sleeve members is of a first longitudinal dimension generally corresponding to the first vertical dimension, and a second number of the plurality of sleeve members having a second longitudinal dimension corresponding generally to the second vertical dimension.

3. The packaging system of claim 2, wherein certain ones of the plurality of sleeve members includes latch means for holding the corresponding downward vertical element thereto.

4. The packaging system of claim 3, wherein the base shelf and each of the shelf members are formed and configured to have at least four corners.

5. The packaging system of claim 4, wherein the base member and each of the shelf members each include at least four upright elements and downward vertical elements, respectively, located generally proximate corresponding corners thereof.

6. The packaging system of claim 4, including means associated with at least one of the support sleeve for each support shelf for holding cabling.

7. The packaging system of claim 1, the base member forming an underside surface, and including drawer means mounted to the underside surface for receiving a power means that operates to supply electrical power to at least predetermined ones of the electronic units through the cabling.

8. A modularized packaging system for holding and supporting a plurality of self-contained electronic cabinets in a stacked arrangement, certain ones of the plurality of electronic cabinets having a first vertical dimension, other ones of the plurality of electronic cabinets having a second vertical dimension, the packaging system comprising:

a plurality of support shelves having dimensions to vertically support the electronic cabinets in vertically stacked configuration;

vertical support means, including a plurality of sleeve members, selectively holding each of the support shelves in a spaced, vertically registered arrangement to one another, first ones of the sleeves members being dimensioned to space first confronting pairs of the support shelves a sufficient vertical distance to receive the cabinets having the first vertical dimension;

wherein each of the plurality of support shelves includes a generally planar support surface, and the vertical support means includes, for each of the plurality of support shelves, a plurality of vertical members mounted in spaced configuration about the periphery of planar support surface of the support shelf, each of the plurality of the vertical members being formed and configured to position and hold a sleeve member, and predetermined ones of the sleeve members each include means for forming a cableway when mounted to the vertical members, the cableway being adapted to receive and guide interconnecting cables and/or wiring from at least one of the electronic cabinets.

9. The modularized packaging system of claim 8, wherein the plurality of cabinets all have substantially the same horizontal dimensions, the plurality of support shelves having horizontal dimensions conforming to those of the cabinets.

10. The modularized packaging system of claim 8, wherein one of the support shelves forms a bottom support shelve located at the bottom of the packaging system, the bottom shelf including means for interconnecting cabling to and from cabinets supported by other of the support shelves and a cabinet supported by the bottom support shelf.

11. The modularized packaging system of claim 8, the vertical support means including second ones of the plurality of sleeve members dimensioned to space second confronting pairs of the support shelves a sufficient vertical distance to receive the cabinets having the second vertical dimension.

12. A packaging system for a plurality of self-contained electronic units, each of the plurality of electronic units having substantially identical footprint dimensions and having cabling emanating therefrom, first ones of the plurality of the electronic units having a first vertical dimension, second ones of the electronic units having a second vertical dimension, the packaging system comprising:

a plurality of shelf members, including a base member, formed and configured to support corresponding ones of the first and second ones of the plurality of the electronic units;

support sleeve means for supporting the plurality of shelf members in vertical, stacked, and spaced relation on and above the base member, certain of the support sleeve means supporting a one of the plurality of shelf members immediately above and spaced from the base member approximately the first vertical distance therefrom, other of the support sleeve means supporting at least one of a pair of the plurality of shelf members spaced from one another approximately the second vertical distance, the support sleeve means being configured to include cable collection means forming a cableway for receiving and holding the cabling emanating from the plurality of electronic units; and holding means associated with each of the plurality of shelf members for removably holding the corresponding electronic unit in place on the associated one of the plurality of shelf members;

wherein each of the electronic units has a bottom wall contiguous to the associated shelf member, each bottom wall of each of the plurality of electronic units having formed therein a pair of apertures, the holding means including tab means affixed to each of the shelf members for engaging the apertures of the electronic unit associated with each of the plurality of shelf members to hold the electronic member in a fixed position on the corresponding on of the plurality of shelf members.

* * * * *